(12) United States Patent
Roussel et al.

(10) Patent No.: US 9,534,309 B2
(45) Date of Patent: Jan. 3, 2017

(54) COATING METHOD BY ELECTROCATALYZED CHEMICAL GRAFTING OF A SURFACE OF A SUBSTRATE WITH A POLYMERIC LAYER

(75) Inventors: Sebastien Roussel, Soisy sur Seine (FR); Matthieu Laurent, Vaucresson (FR); Christian Maennel, Savigny sur Orge (FR)

(73) Assignee: PEGASTECH, Orsay (FR)

( * ) Notice: Subject to any disclaimer, the term of this patent is extended or adjusted under 35 U.S.C. 154(b) by 769 days.

(21) Appl. No.: 13/996,614

(22) PCT Filed: Dec. 21, 2011

(86) PCT No.: PCT/FR2011/053131
§ 371 (c)(1),
(2), (4) Date: Sep. 19, 2013

(87) PCT Pub. No.: WO2012/085462
PCT Pub. Date: Jun. 28, 2012

(65) Prior Publication Data
US 2014/0001048 A1    Jan. 2, 2014

Related U.S. Application Data

(60) Provisional application No. 61/426,067, filed on Dec. 22, 2010.

(30) Foreign Application Priority Data

Dec. 22, 2010 (FR) ..................... 10 61022

(51) Int. Cl.
*C08J 7/16* (2006.01)
*C25D 13/04* (2006.01)
(Continued)

(52) U.S. Cl.
CPC .. *C25D 9/02* (2013.01); *C08J 7/16* (2013.01); *C09D 5/4411* (2013.01); *C25D 13/04* (2013.01)

(58) Field of Classification Search
CPC .............................. C25D 13/08; C09D 5/4476
See application file for complete search history.

(56) References Cited

U.S. PATENT DOCUMENTS

2007/0209943 A1* 9/2007 Bureau .................... C09D 5/24
                                                                    205/317

FOREIGN PATENT DOCUMENTS

WO   WO 2007/099137    9/2007
WO   WO 2010/112610    10/2010

OTHER PUBLICATIONS

Written Opinion of the International Searching Authority (2012).*
(Continued)

*Primary Examiner* — James Lin
*Assistant Examiner* — Ho-Sung Chung
(74) *Attorney, Agent, or Firm* — Saliwanchik, Lloyd & Eisenschenk

(57) ABSTRACT

The present invention relates to a coating method by electrocatalyzed chemical grafting of a surface of a substrate with a polymeric layer characterized in that it comprises the following steps:
  a. a substrate is provided,
  b. a bath containing at least one polymerizable monomer via a radical route, at least one cleavable aryl salt, at least one reducing agent and at least one solvent is provided, in which a potential difference is applied,
  c. said substrate is immersed in said bath,
  d. a grafted polymer is obtained on the surface of said substrate.

(Continued)

The invention also relates to a substrate obtained according to the coating method by electrocatalyzed chemical grafting, the surface of which is coated with a polymeric layer.

14 Claims, 4 Drawing Sheets

(51) Int. Cl.
*C25D 9/02* (2006.01)
*C09D 5/44* (2006.01)

(56) References Cited

OTHER PUBLICATIONS

Mevellec, V. et al., "Grafting Polymers on Surfaces: A New Powerful and Versatile Diazonium Salt-Based One-Step Process in Aqueous Media," *Chem. Mater.*, 2007, pp. 6323-6330, vol. 19.
Zhang, X. et al., "Studies of Arenediazonium Salts as a New Class of Electropolymerization Initiator," *Journal of Applied Polymer Science*, 1999, pp. 2265-2272, vol. 73.

\* cited by examiner

COATING METHOD BY ELECTROCATALYZED CHEMICAL GRAFTING OF A SURFACE OF A SUBSTRATE WITH A POLYMERIC LAYER

CROSS-REFERENCE TO RELATED APPLICATIONS

This application is the U.S. national stage application of International Patent Application No. PCT/FR2011/053131, filed Dec. 21, 2011, which claims the benefit of U.S. Provisional Application Ser. No. 61/426,067, filed Dec. 22, 2010, the disclosures of which are hereby incorporated by reference in their entireties, including any figures, tables, or drawings.

The present invention relates to a coating method by electrocatalyzed chemical grafting of a surface of a substrate with a polymeric layer.

The present invention is in the field of surface coating of substrates by grafting an organic layer at their surface. Chemical grafting is defined as the immobilization of a molecule by another via a covalent bond.

Several techniques allowing coating of the surface of a substrate with an organic layer are described in the literature, and notably treatments via a chemical soaking route.

It is known to one skilled in the art that it is difficult to chemically graft a polymer to the surface of a material with a covalent bond, through a simple step of soaking of the material in a bath.

Electrochemical grafting methods require the use as substrates to be grafted, of electrically conducting or semi-conducting materials on which a polymer will be grafted via a radical or anion route. These electrochemical methods cannot be applied with any type of materials and are therefore limited to conducting or semi-conducting materials.

European patent EP 0 569 503 describes a method for electrografting an organic layer via an electrochemical route on the surface of a carbonaceous material by electrochemical reduction of diazonium salts in an aprotic medium. In this method, the diazonium salt is grafted on one of the electrodes of the electrochemical cell. Indeed, the material to be grafted put into contact with the diazonium salt solution is used as a cathode. This method therefore can neither be applied with non-conducting materials, nor with conducting materials which are not electrodes of the electrochemical cell. Also, international patent application WO 2007/099137 and Zhang et al. J. Appl. Pol. Sci. 1999, 73, p. 2265 describe electrografting methods at the surface of electrodes.

There also exist non-electrochemical methods for grafting an organic film to the surface of a material. Plasma methods are known which require particular and complex pre-treatments, the monomers for example having to be put in gaseous form. Their implementation is also complex with the requirement of using vacuum facilities or confined enclosures for avoiding dispersion of the monomer.

Non-electrochemical methods for grafting by soaking are also known. International patent application WO 2008/078052 describes a grafting method under non-electrochemical conditions, therefore in the absence of any electric voltage, of an organic layer on the surface of a material in the presence of an adhesion precursor derived from a cleavable aryl salt.

Unlike the methods of the international patent applications WO 2008/078052 and WO 2010/112610, also described in the publication Mévellec et al. Chem. Mat. 2007, 19, 25, p. 6323, the method of the present invention allows a polymeric layer of at least the same thickness than by using the method of the prior art to be obtained, and with a better reproducibility.

Figure 1:
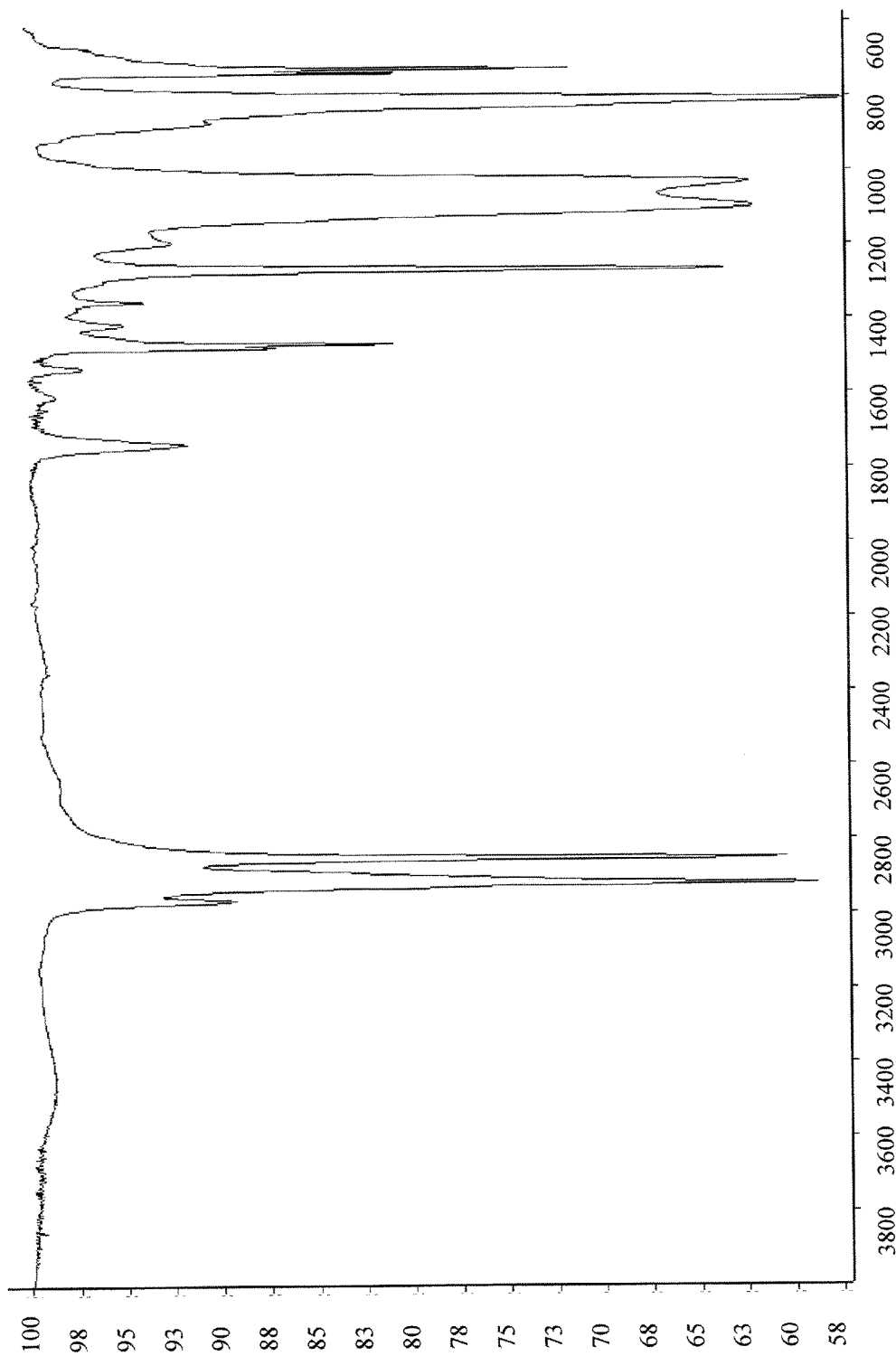
FIG. 1 shows an infrared spectrum of an electrochemically formed PDMS-acrylic polymer graft on an untreated polyethylene substrate, according to an embodiment, where the % transmittance is plotted versus wave number from 3800 to 600 $cm^{-1}$.
Figure 2:
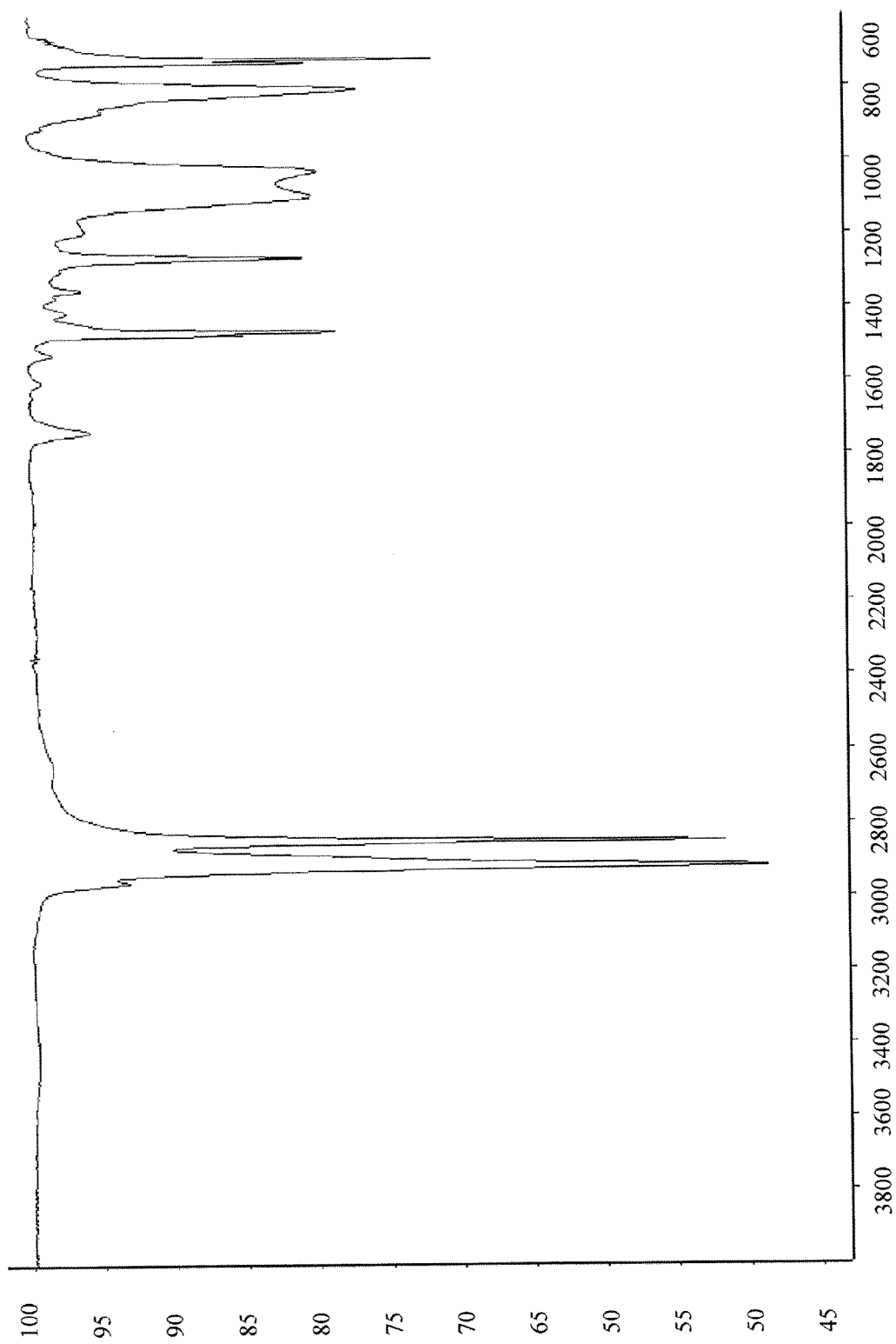
FIG. 2 shows an infrared spectrum of an electrochemically formed PDMS-acrylic polymer graft on a UV/ozone treated polyethylene substrate, according to an embodiment, where the % transmittance is plotted versus wave number from 3800 to 600 $cm^{-1}$.

The present invention relates to a novel, simple to implement, not requiring any particular facilities and faster, coating method by electrocatalyzed chemical grafting of a surface of a material of any type with a polymeric layer in a single step.

The present invention therefore relates to a coating method by electrocatalyzed chemical grafting of a surface of a substrate with a polymeric layer, characterized in that it comprises the following steps:
  a. a substrate is provided,
  b. a bath containing at least one monomer which is polymerizable via radical route, at least one cleavable aryl salt, at least one reducing agent and at least one solvent is provided, in which is applied a potential difference,
  c. said substrate is immersed in said bath,
  d. a grafted polymer is obtained on the surface of said substrate.

In an embodiment, the method further comprises a step a') of preparation of the surface of said substrate consisting of submitting said surface to a physical or chemical treatment for surface modification.

The step of preparation of the surface allows removing the impurities of any type which are present on the surface to be grafted, and thereby increasing the adherence of the coating on the surface of a substrate.

In an embodiment, the physical or chemical treatment is an oxidizing physical or chemical treatment.

By electrocatalyzed chemical grafting is meant the chemical grafting of a polymeric layer at the surface of a substrate by simply soaking said substrate in a bath, in which is applied a potential difference, comprising at least one monomer which is polymerizable via a radical route, at least one cleavable aryl salt, at least one reducing agent and at least one solvent. The method according to the invention gives the possibility of obtaining a particularly homogeneous polymeric layer on the surface of the substrate.

By polymeric layer is meant a thin polymeric layer, obtained from one or several monomers, of a few nanometers to several hundred nanometers, which coats the surface of a substrate.

According to the present invention, the substrate may be, as non-limiting examples, a nanoparticle, a microparticle, a plug of cosmetic products, an electronic element, a door handle, an electro-domestic appliance, spectacles, a decorative object, a vehicle body element, a fuselage, an airplane wing element, a flexible conductor or a connector, a piston, a gasket, a syringe.

The substrate may be a conducting, semi-conducting or non-conducting material.

By conducting substrate is meant any electrically conducting material.

In an embodiment, the conducting substrate is selected from metals, stainless steel, steels, noble metals and alloys thereof. In an embodiment, the conducting substrate is carbon.

By semi-conducting substrate is meant any material having an electric conductivity intermediate between that of metals and that of insulators. As non-limiting examples, mention may notably be made of silicon, germanium, silicon carbide.

By non-conducting substrate is meant any material belonging to the family of organic materials, to the family of mineral materials or to the family of composite materials. As non-limiting examples, mention may be made of wood, paper, cardboard, ceramics, plastics, silicones, textile, glass.

In an embodiment, the non-conducting material is a polymer selected from the group comprising natural, artificial, synthetic, thermoplastic, thermosetting, thermostable, elastomeric, one-dimensional and three-dimensional polymers.

In an embodiment, the non-conducting material may further comprise at least one element selected from the group comprising fillers, plasticizers and additives.

In an embodiment, the fillers are mineral fillers selected from the group comprising silica, talc, glass fibers or beads.

In an embodiment, the fillers are organic fillers selected from the group comprising cereal flour and cellulose paste.

Additives are used for improving a specific property of the material such as its color, its cross-linking, its sliding, its resistance to degradation, to fire and/or to bacterial and/or fungal attacks.

In an embodiment, the polymer is a thermo-plastic (co)polymer selected from the group comprising a polyolefin, a polyester, a polyether, a vinyl polymer, a vinylidene polymer, a styrene polymer, a (meth)acrylic polymer, a polyamide, a fluorinated polymer, a cellulosic polymer, a poly(arylenesulfone), a polysulfide, a poly(arylether)ketone, a polyamide-imide, a poly(ether)imide, a polybenzimidazole, a poly(indene/coumarone), a poly(paraxylylene), alone, as a mixture, as a copolymer or as a combination.

The polyolefins may be selected from the group comprising a polyethylene, a polypropylene, an ethylene/propylene copolymer, a polybutylene, a polymethylpentene, an ethylene/vinyl acetate copolymer, an ethylene/vinyl alcohol copolymer, an ethylene/methyl acrylate copolymer, alone, as a mixture, as copolymers or as a combination.

The polyesters may be selected from the group comprising a polyethylene terephthalate, either modified or non-modified by glycol, a polybutylene terephthalate, polyactide, a polycarbonate, alone, as a mixture, as copolymers or as a combination.

The polyethers may be selected from the group comprising a poly(oxymethylene), a poly(oxyethylene), a poly(oxypropylene), a poly(phenylene ether), alone, as a mixture, as copolymers or as a combination.

The vinyl polymers may be selected from the group comprising an optionally chlorinated poly(vinyl chloride), a poly(vinyl alcohol), a poly(vinyl acetate), a poly(vinyl acetal), a poly(vinyl formaldehyde), a poly(vinyl fluoride), poly(vinyl chloride/vinyl acetate) alone, as a mixture, as copolymers or as a combination.

The vinylidene polymers may be selected from the group comprising poly(vinylidene chloride), poly(vinylidene fluoride), alone, as a mixture, as copolymers or as a combination.

Styrene polymers may be selected from the group comprising a polystyrene, a poly(styrene/butadiene), a poly(acrylonitrile/butadiene/styrene), a poly(acrylonitrile/styrene), a poly(acrylonitrile/ethylene/propylene/styrene), a poly(acrylonitrile/styrene/acrylate), alone, as a mixture, as copolymers or as a combination.

(Meth)acrylic polymers may be selected from the group comprising a polyacrylonitrile, a poly(methyl acrylate), a poly(methyl methacrylate), alone, as a mixture, as copolymers or as a combination.

Polyamides may be selected from the group comprising a poly(caprolactam), a poly(hexamethylene adipamide), a poly(lauroamide), a polyether-block-amide, a poly(metaxylylene adipamide), a poly(metaphenylene isophthalamide), alone, as a mixture, as copolymers or as a combination.

Fluorinated polymers may be selected from the group comprising a polytetrafluoroethylene, a polychlorotrifluoroethylene, a perfluorinated poly(ethylene/propylene), a poly(vinylidene fluoride), alone, as a mixture, as copolymers or as a combination.

Cellulosic polymers may be selected from the group comprising cellulose acetate, cellulose nitrate, methyl cellulose, carboxymethyl cellulose, ethyl methyl cellulose, alone, as a mixture, as copolymers or as a combination.

Poly(arylenesulfones) may be selected from the group comprising a polysulfone, a polyethersulfone, a polyarylsulfone, alone, as a mixture, as copolymers or as a combination.

Polysulfides may be poly(phenylene sulfide).

Poly(arylether ketones) may be selected from the group comprising a poly(ether ketone), a poly(ether ether ketone), a poly(ether ketone ketone), alone, as a mixture, as copolymers or as a combination.

In an embodiment, the polymer is a thermosetting (co)polymer selected from the group comprising an aminoplast, such as urea-formol, melamine-formol, melamine-formol/polyesters, alone, as copolymers, as a mixture or as a combination, a polyurethane, an unsaturated polyester, a polysiloxane, a formophenol, epoxide, allylic or vinylester resin, an alkyde, a polyurea, a polyisocyanurate, poly(bis-maleimide), a polybenzimidazole, a polydicyclopentadiene, alone, as copolymers, as a mixture or as a combination.

In an embodiment, the (co)polymer is selected from the group comprising acrylonitrile-butadiene-styrene (ABS), acrylonitrile-butadiene-styrene/polycarbonate (ABS/PC), a polyamide (PA) such as nylon, a polyamine, a poly(acrylic acid), a polyaniline and polyethylene terephthalate (PET).

By polymerizable monomer via a radical route is meant any monomer which may polymerize under radical conditions in the presence of a radical entity. Polymerization via a radical route is a chain polymerization with radicals as active species.

In an embodiment, the polymerizable monomer via a radical route is selected from molecules comprising at least one ethylenic bond, preferably at least one terminal ethylenic bond.

In an embodiment, the polymerizable monomer via a radical route is selected from acrylic monomers, vinyl monomers and derivatives thereof.

In an embodiment, the polymerizable monomer via a radical route is selected from the group consisting of vinyl acetate, acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate and derivatives thereof, acrylamides such as aminoethyl, propyl, butyl, pentyl and hexyl methacrylamides, cyanoacrylates, diacrylates, dimethacrylates, triacrylates, trimethacrylates, tetraacrylates, tetramethacrylates, styrene and derivatives thereof, parachlorostyrene, pentafluorostyrene, N-vinyl pyrrolidone, 4-vinyl pyridine, 2-vinyl pyridine, vinyl, acryloyl and methacryloyl halides, divinylbenzene.

In an embodiment, the polymerizable monomer via a radical route is selected from polysiloxanes with vinyl or acryl terminations.

By siloxane with a vinyl or acryl termination is meant a saturated hydride of silicon and oxygen formed with linear or branched chains of alternate silicon and oxygen atoms, including terminal vinyl or acryl moieties.

In an embodiment, the polymerizable monomer via a radical route is selected from the group formed by polyalkylsiloxanes with acryl or vinyl terminations such as polymethylsiloxane with vinyl or acryl terminations, polydimethylsiloxane with vinyl or acryl terminations like polydimethylsiloxane-acrylate (PDMS-acrylate), polyarylsiloxanes with vinyl or acryl terminations such as polyphenylsiloxane with vinyl or acryl terminations like polyvinylphenylsiloxane, polyarylalkylsiloxanes with vinyl or acryl terminations such as polymethylphenylsiloxane with vinyl or acryl terminations.

The solubility of a compound called a solute is the maximum concentration of solute which can be dissolved or dissociated in a given amount of solvent, at a given temperature.

According to the invention, the polymerizable monomers via a radical route have a finite solubility value in the solvent of the bath of step c), i.e. the monomers are soluble in said solvent until saturation of the medium.

In an embodiment, the solubility of the polymerizable monomers via a radical route in the solvent of the bath of step c) is less than 0.1M.

In an embodiment, it is comprised between $5.10^{-2}$ and $10^{-6}$ M.

By cleavable aryl salt is notably meant a compound of general formula $ArN_2^+, X^-$ wherein Ar represents the aryl group and $X^-$ represents an anion. The aryl group in an organic compound is a functional group stemming from an aromatic ring.

According to the invention, the cleavable aryl salt has both the role of an adhesion primer and of that of a precursor of radicals. Indeed, the reduction of said cleavable aryl salt allows the formation of radicals which generate a primer layer at the surface of the substrate by chemisorption and initiate chain polymerization of the polymerizable monomers via a radical route, present in the medium.

In an embodiment, the anions $X^-$ are selected from inorganic anions such as halides, such as $I^-$, $Cl^-$ and $Br^-$, halogen borates such as tetrafluoroborate and organic anions such as alcoholates, carboxylates, perchlorates and sulfonates.

In an embodiment, the aryl groups Ar are selected from aromatics or heteroaromatics, optionally mono- or polysubstituted, consisting of one or several aromatic rings comprising from 3 to 8 carbon atoms. The hetero-atoms of the hetero-aromatic compounds are selected from N, O, P and S. The substituents may contain alkyl groups and one or several hetero-atoms such as N, O, F, Cl, P, Si, Br or S.

In an embodiment, the aryl groups are selected from aryl groups substituted with attractive groups such as $NO_2$, COH, CN, $CO_2H$, ketones, esters, amines and halogens.

In an embodiment, the aryl groups are selected from the group consisting of phenyl and nitrophenyl.

According to the invention, the cleavable aryl salt is selected from the group consisting of aryl diazonium salts, aryl ammonium salts, aryl phosphonium salts, aryl sulfonium salts and aryl iodonium salts. In an embodiment the cleavable aryl salt is an aryl diazonium salt.

In an embodiment, the cleavable aryl salt is selected from the group consisting of phenyldiazonium tetrafluoroborate, 4-nitrophenyldiazonium tetrafluoroborate, 4-bromophenyldiazonium tetrafluoroborate, 4-aminophenyldiazonium chloride, 4-aminomethylphenyldiazonium chloride, 2-methyl-4-chloro-phenyldiazonium chloride, 4-benzoylbenzenediazonium tetrafluoroborate, 4-cyanophenyldiazonium tetrafluoroborate, 4-carboxyphenyldiazonium tetrafluoroborate, 4-acetamido-phenyldiazonium tetrafluoroborate, 4-phenylacetic acid diazonium tetrafluoroborate, 2-methyl-4-[(2-methylphenyl)diazenyl]benzenediazonium sulfate, 9,10-dioxo-9,10-dihydro-1-anthracenediazonium chloride, 4-nitro-naphthalenediazonium tetrafluoroborate and naphthalenediazonium tetrafluoroborate.

In an embodiment, the cleavable aryl salt is selected from the group consisting of 4-nitrophenyldiazonium tetrafluoroborate, 4-aminophenyldiazonium chloride, 2-methyl-4-chlorophenyldiazonium chloride, 4-carboxyphenyldiazonium tetrafluoroborate.

In an embodiment, the concentration of cleavable aryl salt is comprised between $5.10^{-3}$ M and $10^{-1}$ M.

In an embodiment, the concentration of cleavable aryl salt is of the order of $5.10^{-2}$ M.

In an embodiment, the cleavable aryl salt is prepared in situ in step b).

By reducing agent, is meant a compound which during an oxidation-reduction reaction yields electrons. According to the present invention, the reducing agent has an oxidation-reduction potential for which the potential difference relatively to the oxidation-reduction potential of the cleavable aryl salt is comprised between 0.3 V and 3V.

According to the invention, the reducing agent is selected from the group consisting of reducing metals which may appear in finely divided form such as iron, zinc, or nickel, a metal salt may be in the form of a metallocene and an organic reducing agent may be such as hypophosphorous acid, ascorbic acid.

In an embodiment, the concentration of reducing agent is comprised between 0.005M and 2M.

In an embodiment, the concentration of reducing agent is of the order of 0.6M.

By potential difference is meant the oxidation-reduction potential difference measured between two electrodes.

According to the invention, a potential difference is applied in the bath. According to the invention, no current flows in the substrate, in particular the substrate is not an electrode of the system. This is particularly important when the substrate is conductive.

In an embodiment, the potential difference is applied by a generator connected to two electrodes, either identical or different, immersed in the bath of step b).

In an embodiment, the electrodes are selected from stainless steel, steel, nickel, platinum, gold, silver, zinc, iron, copper, in pure form or in alloy form.

In an embodiment, the electrodes are in stainless steel.

In an embodiment, the potential difference applied by a generator is comprised between 0.1V and 2V.

In an embodiment, it is of the order of 0.7V.

In an embodiment, the potential difference is generated by a chemical cell.

By chemical cell is meant a cell consisting of two electrodes connected through an ionic bridge. According to the present invention, both electrodes are suitably selected so that the potential difference is comprised between 0.1V and 2.5V.

In an embodiment, the chemical cell is created between two different electrodes immersed in the bath of step b).

In an embodiment, the electrodes are selected from nickel, zinc, iron, copper, silver, in pure form or in alloy form.

In an embodiment, the potential difference generated by the chemical cell is comprised between 0.1V and 1.5V.

In an embodiment, the potential difference is of the order of 0.7V.

In an embodiment, the electrodes are chemically insulated in order to avoid any contact between the substrate immersed in the bath of step b) and the electrodes also immersed in the bath of step b).

According to the invention, the bath of step b) of the method may further comprise at least one surfactant when the polymerizable monomer via a radical route is non-miscible in the solvent of the medium. The surfactants are amphiphilic molecules, comprising both a hydrophilic portion and a lipophilic portion. When their concentration is sufficient for reaching the critical micellar concentration, the surfactants group together in order to form micelles and thereby allow solubilization of the non-miscible monomer in the solvent. The surfactants used according to the invention are selected from anionic, cationic, neutral, amphoteric and zwitterionic surfactants.

In an embodiment, the surfactant is selected from the group of anionic surfactants comprising tetraethylammonium paratoluene-sulfonate, sodium dodecylsulfate, sodium palmitate, sodium stearate, sodium myristate, sodium di(2-ethylhexyl)sulfosuccinate, methylbenzene sulfonate and ethylbenzene sulfonate.

In an embodiment, the surfactant is selected from the group of catonic surfactants comprising tetrabutylammonium chloride, tetradecylammonium chloride, tetradecyltrimethyl ammonium bromide (TTAB), alkylpyridinium halides bearing an aliphatic chain and alkyl ammonium halides.

In an embodiment, the surfactant is selected from the group of neutral surfactants comprising polyethers like polyethoxylated surfactants such as polyoxyethyleneglycol dodecyl ether (POE23 or Brij®35), polyols such as glucose alkylates, such as glucose hexanate.

In an embodiment, the surfactant is selected from the group of amphoteric surfactants comprising disodium lauroamphodiacetate, betaines such as alkylamidopropyl-betaine or laurylhydroxysulfobetaine.

In an embodiment, the surfactant is selected from the group of zwitterionic surfactants comprising sodium N,N-dimethyldodecylammonium butanate, sodium dimethyldodecylammonium propanate and amino acids.

In an embodiment, the concentration of surfactant is comprised between 0.5 mM and 5 M.

In an embodiment, it is comprised between 0.1 mM and 150 mM.

In an embodiment, it is of the order of 10 mM.

In an embodiment, the step a') is implemented by physical treatment.

By physical treatment is meant a treatment allowing removal of the low cohesion layers and increase in the surface roughness.

In an embodiment, the physical treatment is selected from the group of treatments by impacts.

In an embodiment, the group of treatments by impacts comprises sanding, shot-blasting, micro-bead blasting and sanding with abrasive cloths.

In an embodiment, step a') is implemented by a physical oxidizing treatment such as flame or plasma treatments.

In an embodiment, step a') is implemented by chemical treatment.

By chemical treatment, is meant any treatment allowing preparation of the surface by increasing the roughness of the surface, by chemically modifying it so as to make it more or less wetting.

In an embodiment, step a') is implemented by a chemical oxidizing treatment.

By chemical oxidizing treatment is meant a treatment allowing oxidation of the surface of the substrate by attaching thereon and/or by introducing thereto oxygen-rich groups such as carboxylic (—COOH), hydroxyl (—OH), alkoxyl (—OR), carbonyl (—C=O), percarbonic (—C—O—OH), nitro (—$NO_2$) and amides (—CONH) groups.

In an embodiment, the chemical oxidizing treatment is selected from the group comprising Fenton's reagent, alcoholic potash, a strong acid, sodium hydroxide, a strong oxidizer, the UV/ozone combination, either alone or as combinations.

In an embodiment, the strong acid is selected from the group comprising hydrochloric acid, sulfuric acid, nitric acid, perchloric acid, alone or as a mixture.

In an embodiment, the strong acid mass ratios are comprised between 5 and 100%.

In an embodiment, they are comprised between 50 and 95%.

In an embodiment, they are comprised between 70 and 90%.

In an embodiment, the duration of the treatment with the strong acid is comprised between 20 seconds and 5 hours.

In an embodiment, it is comprised between 30 seconds and three hours.

In an embodiment, it is comprised between 30 seconds and 15 minutes.

In an embodiment, the duration of the treatment by Fenton's chemical reaction is comprised between 5 minutes and 5 hours.

In an embodiment, it is comprised between 10 minutes and 3 hours.

In an embodiment, it is comprised between 15 minutes and 2 hours.

In an embodiment, it is of the order of 25 minutes.

In an embodiment, for the treatment with alcoholic potash, potassium hydroxide is diluted in a solution containing as a solvent an alcohol selected from the group comprising methanol, ethanol and propanol.

In an embodiment, said potassium hydroxide is diluted in a solution containing as a solvent ethanol.

In an embodiment, the concentration of potassium hydroxide in the alcoholic solution is comprised between 0.1 M and 10 M.

In an embodiment, it is comprised between 0.5 M and 5M.

In an embodiment, it is of the order of 3.5 M.

In an embodiment, the duration of the treatment with alcoholic potash is comprised between 5 minutes and 5 hours.

In an embodiment, it is comprised between 10 minutes and 3 hours.

In an embodiment, it is comprised between 20 minutes and 2 hours.

In an embodiment, for treatment with sodium hydroxide, the sodium hydroxide mass ratios are comprised between 10 and 100%.

In an embodiment, they are comprised between 15 and 70%.

In an embodiment, they are comprised between 20 and 50%.

In an embodiment, for treatment with a strong oxidizer, the strong oxidizer solution is neutral, acid or basic.

In an embodiment, the strong oxidizer solution is acid.

In an embodiment, the strong oxidizer is selected from the group comprising $KMnO_4$, $KClO_3$, alone or as a mixture, in hydrochloric acid, in sulfuric acid or in nitric acid.

In an embodiment, the concentration of $KMnO_4$, $KClO_3$ in hydrochloric acid, in sulfuric acid or in nitric acid is comprised between 10 mM and 1 M.

In an embodiment, it is comprised between 0.1 M and 0.5 M.

In an embodiment, it is of the order of 0.2 M.

In an embodiment, the concentration of hydrochloric acid, sulfuric acid or nitric acid in the strong oxidizer solution is comprised between 0.1 M and 10 M.

In an embodiment, it is comprised between 0.5 M and 5M.

In an embodiment, it is of the order of 3.5 M.

In an embodiment, the duration of the treatment for a strong oxidizer is comprised between 1 minute and 3 hours.

In an embodiment, it is comprised between 5 minutes and 1 hour.

In an embodiment, it is comprised between 10 minutes and 3 minutes.

In an embodiment, it is of the order of 15 minutes.

In an embodiment, the chemical oxidizing treatment is an electro-chemical treatment.

According to the invention, before and between each step of the method, the surface of the substrate and/or the substrate may be subject to one or several rinses with at least one rinsing solution. The rinsing solution is suitably selected depending on the nature of said substrate in order not to degrade its surface.

In an embodiment, the rinsing step may be accomplished by immersion or by spraying.

In an embodiment, the rinsing solutions are identical or different.

In an embodiment, the rinsing solution is selected from the group comprising water, an organic solvent, an aqueous solution containing a detergent, alone or as a mixture.

In an embodiment, the water may be acid or basic.

In an embodiment, the organic solvent is selected from the group comprising isopropanol, ethanol, acetone, hexane, alone or as a mixture.

In an embodiment, the detergent contained in an aqueous solution is selected from the group comprising TDF4 and sodium hydroxide.

In an embodiment, the sodium hydroxide concentration is comprised between 0.01 M and 1 M.

In an embodiment, the solvent applied in the bath of step b) is preferentially an aqueous solvent.

In an embodiment, the aqueous solvent is selected from water in an acid medium, isopropanol, ethanol, acetonitrile, acetone, alone or as a mixture.

In an embodiment, the aqueous solvent is acid water.

In an embodiment, the pH of the bath of step b) is acid.

In an embodiment, the pH of the bath of step b) is less than or equal to 4.

In an embodiment, it is of the order of 1.

In an embodiment, the duration of the step c) for soaking the surface of the substrate and/or the substrate is comprised between 1 minute and 2.5 hours.

In an embodiment, it is comprised between 20 minutes and 45 minutes.

In an embodiment, the temperature of the bath in step c) is comprised between 5° C. and 65° C.

In an embodiment, it is of the order of 23° C.

The invention also relates to the substrate obtained according to the method of the invention, for which the surface of said substrate is covered with a polymeric layer.

Infrared spectroscopy analyses allow confirming the grafting of polymeric layers at the surface of substrates, as illustrated in FIGS. 1 to 4 by infrared spectra with the wave number expressed in $cm^{-1}$ in abscissas and the transmittance expressed as a percentage in ordinates.

In the present invention, the terms of "of the order of" a value refer to a range extending from 90% to 110% (plus or minus 10%) of this value.

EXAMPLES

The examples which follow were made in a glass tank. Unless specified otherwise, they were made under normal temperature and pressure conditions (about 24° C. and about 1 atm) in ambient air. Unless indicated otherwise, the used reagents were directly obtained commercially without any additional purification. The PE sample had the format 2×4 cm.

Example 1

Electrocatalyzed Chemical Grafting of a PDMS-Acrylic Polymeric Film on a Polyethylene Substrate The following example illustrates how to graft a lubricant coating (PDMS-acrylic) on a thermoplastic such as polyethylene (PE).

Cleaning of the PE samples with ethanol, with sonication (power of 50%, temperature of 40° C.) is carried out for five minutes.

The preparation of the biphasic solution is performed in two steps. In the beaker (1), are added in this order and with magnetic stirring (300 rpm), PDMS-acrylate (1 g/L); Brij® 35 in solution in water at 8.5% wt (4.37 g/L) and 33 mL of DI water. Emulsification is then accomplished with sonication at 40° C. under a power of 200 W (100%) for 15 minutes.

In the beaker (2), are added with magnetic stirring (300 rpm), nitrobenzene diazonium tetrafluoroborate (0.05 mol/L); 130 mL of DI water and hydrochloric acid (0.2 mol/L).

The contents of the beaker (2) is poured into the emulsion of the beaker (1). The PE samples (x2), a galvanized steel wire (wound on 10 turns, i.e. a length of about 25 to 30 cm) and an Ni wire (wound on 10 turns i.e. a length of about 25 to 30 cm) are placed in the beaker (1). Both wires are connected together and an ammeter is connected in series.

Finally, once the circuit is ready, hypophosphorous acid (0.7 mol/L) is added lastly which marks the beginning of the reaction. After 30 minutes of reaction at room temperature, the PE samples are removed and successively rinsed with water, ethanol and finally with isopropanol, in a Soxhlet extractor for 16 hours.

The Soxhlet consists of a glass body in which the sample is placed, of a siphon tube and an adduction tube. The Soxhlet is placed on a flask (here a 500 ml round-bottomed flask heated and stirred via a heating mantle) containing the solvent (here 300 ml of isopropanol) and surmounted with a condenser.

When the flask is heated, the solvent vapors pass through the adduction tube, condense in the condenser and fall down into the glass body, thereby causing maceration of the sample in a pure solvent (heated by the vapors found below). The condensed solvent accumulates in the extractor until it reaches the top of the siphon tube, which then causes return of the liquid into the flask, accompanied by the extracted substances, and the solvent contained in the flask is therefore gradually enriched in soluble compounds.

The solvent then continues to evaporate, while the extracted substances remain in the flask (their boiling temperature should be clearly greater than that of the extracting solvent).

The use of a Soxhlet extractor gives the possibility of confirming chemical grafting of PDMS-acrylic at the surface of the PE substrate.

Analysis by IR spectroscopy is conducted. The infrared spectrum of FIG. 1, with the wave number expressed in $cm^{-1}$ in abscissas and the transmittance expressed as a percentage in ordinates, gives the possibility of confirming grafting of PDMS-acrylic by the presence of the characteristic band at 1,260 $cm^{-1}$ corresponding to the vibration of the Si—$CH_3$ bond.

Example 2

Electrocatalyzed Chemical Grafting of a PDMS-Acrylic Polymer Film on a Pre-Treated Polyethylene Substrate The polyethylene substrate is subject to UV/ozone pre-treatment. The UV treatment consists of submitting the surface of the solid support and/or the solid support to UV light.

The UV surface treatment is carried out in air enriched with oxygen via an ozone generator (UVO-Cleaner Model 42-200 with a low pressure mercury vapor lamp (28 $mW/cm^2$, 254 nm)).

The PE samples are introduced into the generator. The UV/ozone treatment lasts for 10 minutes. The samples undergo within 10 minutes the grafting treatment as in Example 1.

Example 3

Electrocatalyzed Chemical Grafting of a PDMS-Acrylic Polymeric Film on a Polyethylene Substrate in the Presence of a Potentiostat The following example illustrates how to graft a lubricant coating (PDMS-acrylic) on a thermoplastic such as polyethylene (PE) in the presence of a potentiostat.

Cleaning of the PE samples with ethanol, with sonication (power of 100 W, temperature 40° C.) is carried out for 5 minutes.

The preparation of the biphasic solution is performed in two steps. In the beaker (1), are added, in this order and with magnetic stirring (300 rpm), PDMS-acrylate (1 g/L); Brij® 35 in solution in water at 8.5% by wt (4.37 g/L) and 33 mL of DI water. Emulsification is then accomplished with sonication at 40° C. under a power of 200 W (100%) for 15 minutes.

In the beaker (2), are added, with magnetic stirring (300 rpm), nitrobenzene diazonium tetrafluoroborate (0.05 mol/L); 130 mL of DI water and hydrochloric acid (0.2 mol/L).

The contents of the beaker (2) are poured into the emulsion of the beaker (1). The PE samples (x2), a galvanized steel wire (wound on 10 turns, i.e. a length of about 25 to 30 cm) and an Ni wire (wound on 10 turns, i.e. a length of about 25 to 30 cm) are placed in the beaker (1). Both wires are connected to a potentiostat and an ammeter is connected in series. The potentiostat imposes a constant potential difference of 0.5V and the intensity of the current is measured over time via the ammeter.

Finally, once the circuit is ready, hypophosphorous acid (0.7 mol/L) is added lastly which marks the beginning of the reaction. After 30 minutes of reaction at room temperature, the PE samples are removed and successively rinsed with water (cascade) and then with ethanol (cascade) and finally with isopropanol in an Soxhlet extractor for 16 hours.

The use of a Soxhlet extractor allows confirming chemical grafting of PDMS-acrylic at the surface of the PE substrate.

Analysis by IR spectroscopy is conducted. The spectrum of FIG. 2, with the wave number expressed in $cm^{-1}$ in abscissas and with the transmittance expressed as a percentage in ordinates, gives the possibility of confirming grafting of PDMS-acrylic by the presence of the characteristic band at 1,260 $cm^{-1}$ corresponding to the vibration of the $S_1$—$CH_3$ bond.

Comparative Example 4

Non-Electrochemical Grafting of a PDMS-Acrylic Polymeric Film on a Polyethylene Substrate A comparative grafting test via a non-electrochemical route is conducted.

By a method similar to the one described in Example 3, but in the absence of the two steel and nickel wires and of the potentiostat, a PDMS-acrylic polymeric film is grafted on a polyethylene substrate.

Figure 3:
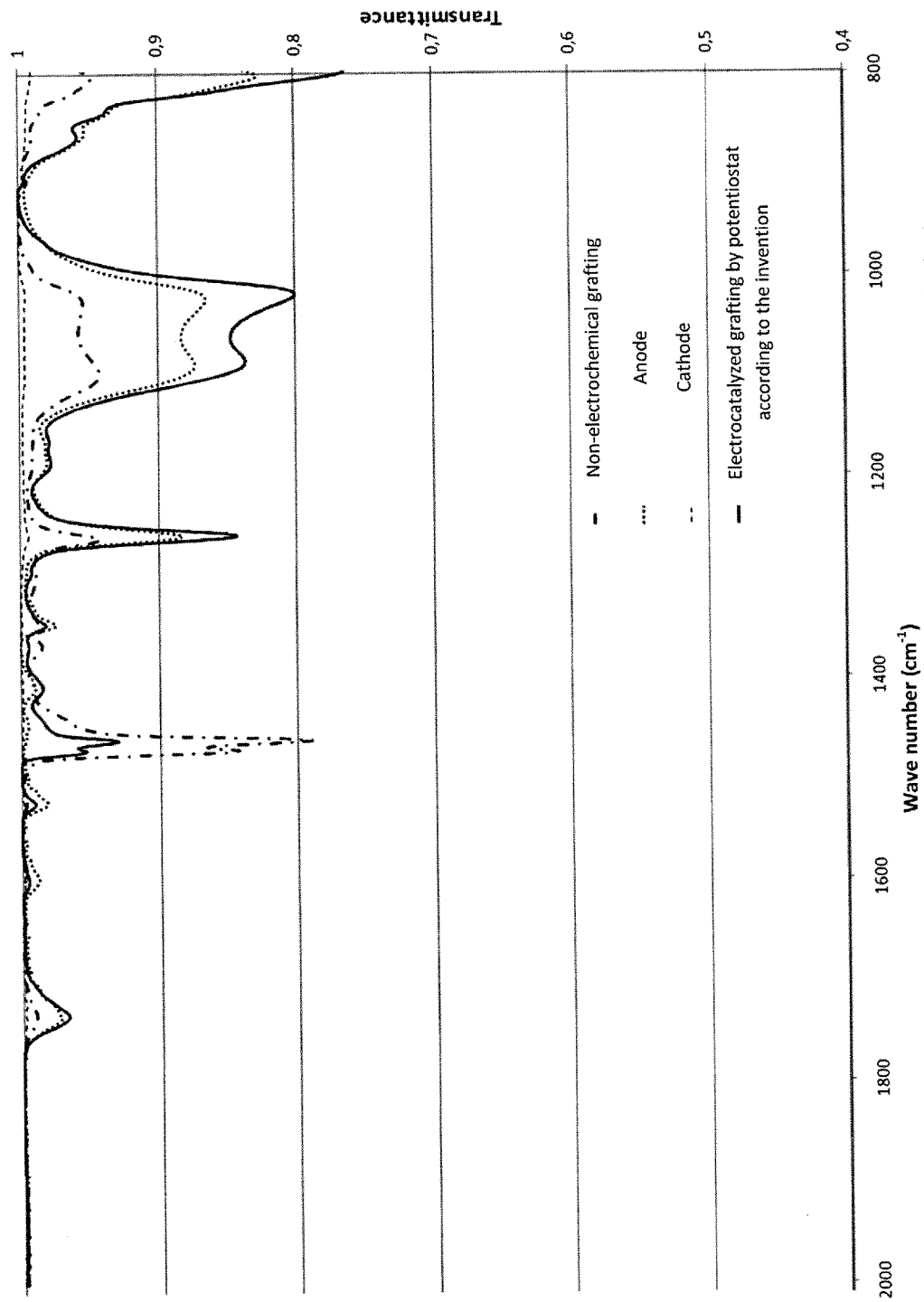
FIG. 3 shows a composite plot of IR spectra for PDMS-acrylic graft on a polyethylene substrate from non-electrochemical grafted film (curve -•-), for electrocatalyzed grafting film, according to an embodiment, assisted with a potentiostat (curve —), as well as IR spectra for the corresponding anode (curve ••••••••) and for the corresponding cathode (curve -----).
Figure 4:
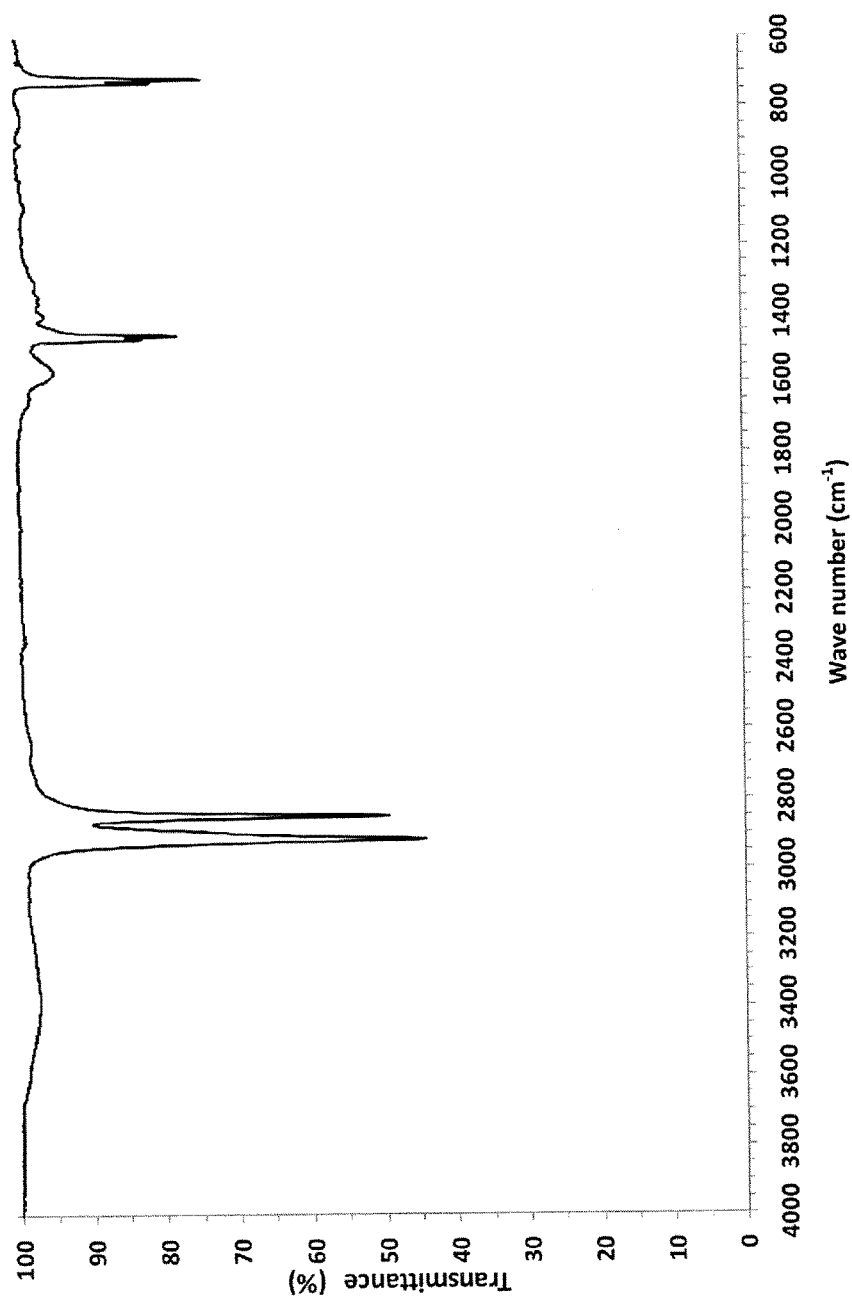
FIG. 4 shows an infrared spectrum of an electrochemically formed acrylic acid polymer graft on an untreated polyethylene substrate, according to an embodiment.

Analysis by IR spectroscopy is conducted. FIG. 3 illustrates the infrared spectra obtained by non-electrochemical grafting (curve -•-), for electrocatalyzed grafting assisted with a potentiostat according to Example 3 of the present invention (curve —) as well as for the corresponding anode (curve ••••••••) and for the corresponding cathode (curve -----). These spectra have the wave number expressed in $cm^{-1}$ in abscissas and the transmittance expressed as a percentage in ordinates.

The infrared spectra of FIG. 3 allows confirming the grafting of PDMS-acrylic by the presence of the characteristic band at 1,260 $cm^{-1}$ corresponding to the vibration of the Si—$CH_3$ bond.

However, by comparing the curve obtained by non-electrochemical grafting with the one obtained by electrocatalyzed chemical grafting, it clearly appears that the electrocatalyzed grafting is much more significant than the one by non-electrochemical grafting for the same reaction time. The grafting of the PDMS-acrylic polymeric layer is faster with the electrocatalyzed grafting method according to the invention.

Example 5

Electrocatalyzed Chemical Grafting of a Poly(Acrylic) Film on a Polyethylene Substrate in the Presence of a Potentiostat The PE sample was washed beforehand with an ethanol jet at room temperature.

1,4-phenylenediammonium dichloride (0.03 mol) was solubilized in a hydrochloric acid solution (11 mL in 400 mL of distilled water). To this solution, were slowly poured 75 mL of a $NaNO_2$ (0.03 mol) solution in water under magnetic stirring. To this solution of diazonium salt, were added 29 mL of acrylic acid (0.4 mol). The PE sample was maintained immersed in the bath. Two stainless steel electrodes of type 316L (2×8 cm) connected through a potentiostat and an ammeter connected in series were immersed in the solution. A constant potential difference of 0.7V was imposed by the potentiostat to the solution and the intensity of the produced current was measured over time via the ammeter. A hypophosphorous acid solution (0.34 mol) was then poured into the solution.

After 1 hour of treatment, the PE sample was then subject to 4 successive rinses at 40° C. in distilled water, 2 0.1 M sodium hydroxide solutions and again in distilled water before being dried with compressed air.

Analysis by IR spectrometry of the PE sample is conducted. The spectrum of FIG. 4, with the wave number expressed in $cm^{-1}$ in abscissas and the transmittance expressed as a percentage in ordinates, allows confirming the grafting of poly(acrylic). The characteristic bands of the pAA at 1,723 $cm^{-1}$ (C=O deformation, acid form) and 1,260 $cm^{-1}$ (C—O deformation) are visible.

Example 6

Electrocatalyzed Chemical Grafting of a PDMS-Acrylic Polymeric Film on a Polyethylene Substrate in the Presence of a Potentiostat The following example illustrates how to graft a lubricant coating (PDMS-acrylic) on a thermoplastic such as polyethylene (PE) in the presence of a potentiostat.

Cleaning the PE samples with ethanol, with sonication (power of 100 W, temperature 40° C.) is carried out for 5 minutes.

The preparation of the biphasic solution is performed in two steps. In the beaker (1), are added, in this order and with magnetic stirring (300 rpm), PDMS-acrylate (1 g/L); Brij® 35 in solution in water at 8.5% by weight (4.3 g/L) and 33 mL of DI water. The emulsification is then accomplished with sonication at 40° C. under a power of 200 W (100%) for 15 minutes.

In the beaker (2), are added, with magnetic stirring (300 rpm), nitrobenzene diazonium tetrafluoroborate (0.06 mol/L); 130 mL of DI water and hydrochloric acid (0.2 mol/L).

The contents of the beaker (2) are poured into the emulsion of the beaker (1). The PE samples (x2), a galvanized steel wire (wound on 10 turns, i.e. a length of about 25 to 30 cm) and an Ni wire (wound on 10 turns, i.e. a length of about 25 to 30 cm) are placed in the beaker (1). The two wires are connected to a potentiostat and an ammeter is connected in series. The potentiostat imposes a constant potential difference of 0.5V and the intensity of the current is measured over time via the ammeter.

Finally, once the circuit is ready, ascorbic acid (0.005 mol/L) is added lastly which marks the beginning of the reaction. After 30 minutes of reaction at room temperature, the PE samples are removed and successively rinsed with water (cascade) and then with ethanol (cascade) and finally with isopropanol in a Soxhlet extractor for 16 hours.

The use of a Soxhlet extractor allows confirming chemical grafting of PDMS-acrylic at the surface of the PE substrate.

Analysis by IR spectroscopy allows confirming grafting of PDMS-acrylic by the presence of the characteristic band at 1260 $cm^{-1}$ corresponding to the vibration of the Si—$CH_3$ bond.

Example 7

Electrocatalyzed Chemical Grafting of a PDMS-Acrylic Polymeric Film on a Nylon Substrate in the Presence of a Potentiostat The following example illustrates the grafting of a lubricant coating (PDMS-acrylic) on a nylon substrate (polyamide 6,6) in the presence of a potentiostat.

The preparation of the biphasic solution is performed in two steps. In the beaker (1) are added, in this order and with magnetic stirring, PDMS-acrylate (1 g/L); Brij® 35 in solution in water at 8.5% by weight (4.3 g/L) and 33 mL of DI water. The emulsification is then accomplished with sonication at 40° C. under a power of 200 W (100%) for 20 minutes.

In the beaker (2), are added, with magnetic stirring, nitrobenzene diazonium tetrafluoroborate (0.06 mol/L), 130 mL of DI water and hydrochloric acid (0.2 mol/L).

The contents of the beaker (2) are poured into the emulsion of the beaker (1). The nylon substrates as well as the stainless steel electrodes are placed in the beaker (1). Both electrodes are connected to a potentiostat under a potential difference of 0.8V.

Ascorbic acid (0.005 mol/L) is then added. After 30 minutes of reaction at room temperature, the samples are removed and successively rinsed with water and then with ethanol.

An analysis by contact angle allows confirming grafting of PDMS-acrylic.

Example 8

Electrocatalyzed Chemical Grafting of a Polyhydroxyethyl Methacrylate (PHEMA) Polymeric Film on a Stainless Steel Substrate in the Presence of a Potentiostat The following example illustrates the grafting of a PHEMA film on a stainless steel substrate in the presence of a potentiostat.

In a beaker, are added, with magnetic stirring, nitrobenzene diazonium tetrafluoroborate (0.06 mol/L), 130 mL of DI Water and hydrochloric acid (0.2 mol/L) as well as hydroxy-ethyl methacrylate (5 g/L). The stainless steel substrates as well as the stainless steel electrodes are placed in the beaker. Both electrodes are connected to a potentiostat under a potential difference of 0.8V.

Finally, once the circuit is ready, ascorbic acid (0.005 mol/L) is added. After 30 minutes of reaction at room temperature, the samples are removed and successively rinsed with water and then with ethanol.

An infrared analysis allows proving the grafting of a PHEMA film.

Example 9

Electrocatalyzed Chemical Grafting of a Polyacrylic Acid (PAA) Polymeric Film on a Carbon Substrate in the Presence of a Potential

The following example illustrates the grafting of a PAA film on a carbon substrate (carbon felt) in the presence of a potentiostat.

In a beaker, are added with magnetic stirring, nitrobenzene diazonium tetrafluoroborate (0.06 mol/L), 130 mL of DI water and hydrochloric acid (0.2 mol/L) as well as acrylic acid (5 g/L). The carbon substrates, disks with a diameter of 5 cm, as well as the stainless steel electrodes, are placed in the beaker. Both electrodes are connected to a potentiostat under a potential difference of 0.8V. The whole is stirred by means of a peristaltic pump allowing the liquid to penetrate into the felt.

Ascorbic acid (0.005 mol/L) is finally added. The reaction is left with stirring for 30 minutes at room temperature, the samples are removed and successively rinsed with water and then with ethanol.

The grafting of the PAA film is confirmed notably by the "crisp" aspect of the carbon felt.

Example 10

Electrocatalyzed Chemical Grafting of a Poly(Sodium Styrene Sulfonate) (PSSNA) Polymeric Film on a Polyethylene Substrate in the Presence of a Potentiostat

The following example illustrates the grafting of a PSSNA film on a polyethylene substrate in the presence of a potentiostat:

In a beaker are added with magnetic stirring, nitrobenzene diazonium tetrafluoroborate (0.06 mol/L), 130 mL of DI water and hydrochloric acid (0.2 mol/L) as well as sodium styrene sulfonate (8 g/L). The substrates as well as the stainless steel electrodes are placed in the beaker. Both electrodes are connected to a potentiostat under a potential difference of 0.6 V.

Finally, once the circuit is ready, ascorbic acid (0.005 mol/L) is added. After 30 minutes of reaction at room temperature, the samples are removed and successively rinsed with water and then with ethanol.

Analysis by contact angle allows confirming grafting of PSSNA.

The invention claimed is:

1. A coating method by electrocatalyzed chemical grafting of a substrate surface with a polymeric layer comprising:
   a) providing a substrate;
   b) applying a potential difference to a bath containing at least one radically polymerizable monomer, at least one cleavable aryl salt, at least one reducing agent, and at least one solvent;
   c) immersing said substrate in said bath, and
   d) grafting a polymer on the surface of said substrate,
   wherein said monomer comprises at least one ethylenic bond;
   wherein said potential difference is generated by a chemical cell created between two electrodes immersed in said bath,
   wherein the two electrodes are different from the substrate.

2. The method according to claim 1, wherein said substrate is a conducting, semi-conducting, or non-conducting substrate.

3. The method according to claim 2, wherein said substrate is a conducting substrate selected from metals, stainless steel, steels, noble metals or alloys thereof.

4. The method according to claim 2, wherein said substrate is a non-conducting substrate selected from natural, artificial, synthetic, thermoplastic, thermosetting, thermostable, elastomeric, one-dimensional, or three-dimensional polymers.

5. The method according to claim 1, wherein said monomer comprises an acrylate or a derivative thereof.

6. The method according to claim 1, wherein said cleavable aryl salt is selected from the group consisting of aryl diazonium salts, aryl ammonium salts, aryl phosphonium salts, aryl sulfonium salts and aryl iodonium salts.

7. The method according to claim 1, wherein said cleavable aryl salt is prepared in situ in step b).

8. The method according to claim 1, wherein said reducing agent is a reducing metal, a metal salt, or an organic reducing agent.

9. The method according to claim 8, wherein said reducing metal is finely divided.

10. The method according to claim 8, wherein said metal salt is a metallocene.

11. The method according to claim 8, wherein said organic reducing agent is hypophosphorous acid or ascorbic acid.

12. The method according to claim 1, wherein said electrodes are nickel, zinc, iron, silver, copper, or an alloy thereof.

13. The method according to claim 1, wherein said potential difference generated by the chemical cell is 0.1 V to 1.5 V.

14. The method according to claim 1, wherein the pH of said bath is acidic.

* * * * *